Figure 1:
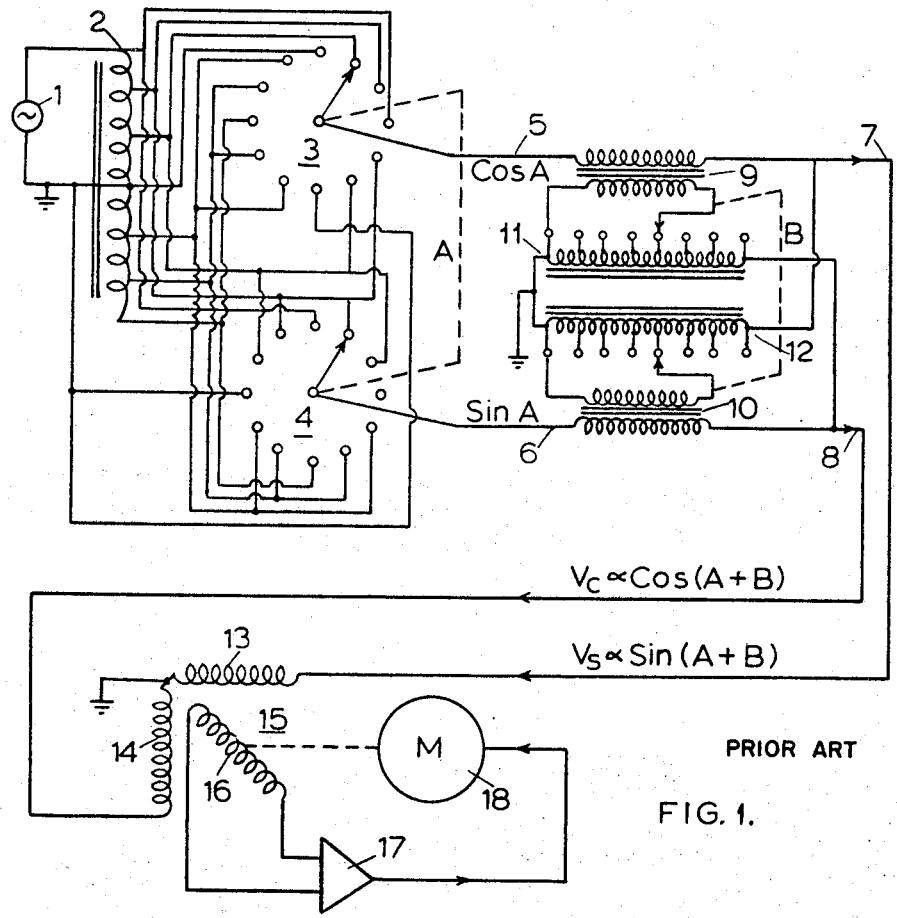

Dec. 31, 1968

F. W. HARTLEY 3,419,774

POSITION CONTROL SERVO MECHANISM USING A
TRIGONOMETRIC FUNCTION GENERATOR

Filed Feb. 2, 1965

United States Patent Office 3,419,774
Patented Dec. 31, 1968

3,419,774
POSITION CONTROL SERVO MECHANISM USING A TRIGONOMETRIC FUNCTION GENERATOR
Frederick Walter Hartley, Hayes, England, assignor to Electric & Musical Industries Limited, Hayes, England, a company of Great Britain
Filed Feb. 2, 1965, Ser. No. 429,858
Claims priority, application Great Britain, Feb. 7, 1964, 5,247/64
4 Claims. (Cl. 318—18)

A position control servo mechanism using a resolver with quadrature windings on both rotor and stator, with command signals in the form of alternating voltages proportional to the sine and cosine of an angle respectively applied to the windings of the stator. Output voltages are derived from the windings of the rotor and one of these voltages is applied to an auto-transformer from which is derived a fraction, such as the tangent function, dependent on a second angle, and the other output voltage and the fraction from the auto-transformer are summed to produce an error signal which is used to drive a servo motor rotating the rotor of the resolver. This servo mechanism tends to set the resolver to a position representing the sum of the two angles. If the second angle is always small the fraction derived from the auto-transformer can be linearly related to the second angle.

This invention relates to a position control servo mechanism of the type using a trigonometric function generator, from which signals are applied to a resolver coupled to a part to be positioned.

It is a requirement in position control apparatus that a device be set to a given position in response to a command. The command may, for example, be provided by the manual setting of a series of control knobs or by uniselector, relay or transistor switches which are arranged to provide alternating voltages the amplitudes of which are trigonometrical functions of the displacement required, taking a given unit displacement to correspond to an angle of $2\pi$. The alternating voltages are applied to the stator windings of a resolver and the voltages induced in a rotor winding of the resolver are used to operate a servo mechanism which rotates the rotor until the induced voltage is zero. The rotor is coupled mechanically to the device which is to be set to the given position.

The series of control knobs, operating in stepped fashion, is arranged to provide alternating voltages related to the desired displacements in different orders, that is to say, a first control knob could be calibrated in multiples of 0.01 inch where 0.2 inch represents $2\pi$ whereas a second control knob could be calibrated to provide increments on that provided by the first control knob in multiples of 0.0001 inch. It is then required to produce according to the settings of the control knobs voltages proportional to $\cos(A+B)$ and $\sin(A+B)$ for application to the stator windings of the resolver, where A and B are the angles corresponding to the multiples of 0.01 inch and the multiples of 0.001 inch respectively on the above angular scale. It may be shown that if these voltages are designated as $V_c$ and $V_s$ respectively $$V_c \, \alpha (\cos A - V_s \tan B)$$

and $$V_s \, \alpha (\sin A - V_c \tan B)$$

A known position control system ultilising these relations is illustrated schematically in FIGURE 1. An alternating current source 1 supplies current to an auto-transformer 2 which has tappings on it which provide voltages related to sine and cosine fractions of the voltage across the whole winding. Only a small number of tappings is shown, although in practice a much larger number, say 25, would be used. These are selected according to the position of the control knob used for setting the value A which operates the ganged selector switches 3 and 4. Thus voltages proportional to $\cos A$ and $\sin A$ are produced on the lines 5 and 6, respectively. The voltage $V_c$ is produced on the line 7 by adding in the transformer 9 a voltage proportional to $V_s \tan B$, and the voltage $V_s$ on the line 8 by adding in the transformer 10 a voltage proportional to $V_c \tan B$. The voltage $V_s \tan B$ is produced by feeding the voltage $V_s$ from the line 8 to an autotransformer 11 which has tappings which, according to the position of a movable contact set by the control knob for setting the value B, select a fraction $\tan B$ of the voltage applied to said auto-transformer. The voltage $V_c \tan B$ is produced by feeding the voltage $V_c$ from the line 7 to an auto-transformer 12 which similarly allows a fraction $\tan B$ of the voltage $V_c$ to be produced. The movable contacts on the auto-transformers 11 and 12 are ganged so that a single control knob sets the position of both. The voltages $V_c$ and $V_s$ are applied to the quadrature stator windings 13 and 14 of the resolver 15. The rotor coil 16 feeds its output to an amplifier 17 which in turn drives a motor 18 ganged to the rotor until the voltage induced in the coil 16 is zero.

It will be observed that the system described in outline above requires three auto-transformer cores, namely those designated as 2, 11 and 12 in FIGURE 1. It is an object of the invention to provide an improved position control system wherein a lesser number of such cores is required thereby effecting economies in the construction of the system.

According to the invention there is provided a position control servo mechanism including a resolver having first and second relatively movable parts each provided with two inductors in quadrature, means for producing and applying to the respective inductors on the first part alternating voltages respectively representing the sine and cosine of a first angle, means for deriving an output voltage from one of the inductors on the second part, and means for producing relative displacement of the resolver parts in response to the output voltage in a sense tending to reduce the output voltage, wherein the improvement comprises means for deriving a second output voltage from the other of the inductors on the second part, means for producing a fraction of the second output voltage, which fraction is dependent on a second angle, and means for adding the fraction of the second output voltage to the output voltage from the one of the inductors on the second part to modify the latter output voltage, whereby the relative displacement tends to that represented by the sum of the first and second angles.

In one embodiment of the invention the means for producing and applying alternating voltages includes means for generating a plurality of alternating voltages respectively representing the sine and cosine of a series of angles spaced apart by the same angular interval and means for selecting from among the voltages generated by the generating means, the voltages respectively representing the sine and cosine of the first angle, and the means for producing a fraction of the second output voltage includes auto-transformer means with a series of tappings respectively corresponding to a second series of angles smaller than the angular interval, and means for selecting from among the tappings, the tapping corresponding to the second angle.

Figure 2:
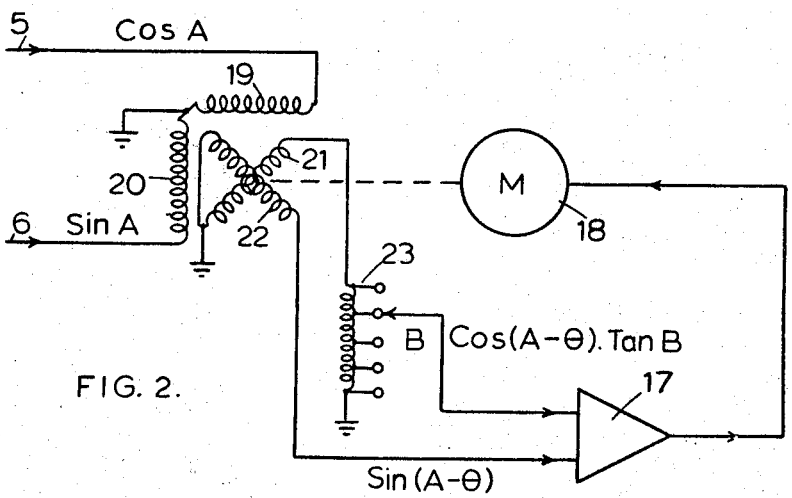

In order that the invention may be clearly understood and readily carried into effect, it will now be described with reference to the accompanying drawings, in which:

FIGURE 1 illustrates schematically a known position control system referred to above, and FIGURE 2 illustrates schematically and partially a position control system according to the invention.

Referring to FIGURE 2, the voltages proportional to cos A and sin A are derived as already described with reference to FIGURE 1 on the lines 5 and 6. These lines are similarly designated as 5 and 6 in FIGURE 2. These voltages are applied to the quadrature stator windings 19 and 20 of a resolver which has quadrature rotor windings 21 and 22. If the rotor is in such a position that the angle between the winding 21 and a reference position parallel to the stator winding 19 is $\theta$, then the voltages induced in the windings 21 and 22 are proportional to cos $(A-\theta)$ and to sin $(A-\theta)$ respectively. An error voltage, which is amplified by the amplifier 17 which in turn drives the motor 18 ganged to the rotor and rotates it until the error voltage is zero, is derived by taking a fraction tan B of the voltage proportional to cos $(A-\theta)$ and adding to it the voltage proportional to sin $(A-\theta)$. This is effected by applying the voltage proportional to cos $(A-\theta)$ across the winding 21 to an auto-transformer 23 provided with tappings which, according to the position of a movable contact set by the control knob for setting the value B, select a fraction tan B of the voltage applied thereto. The voltage derived thereby is added in the amplifier 17 to the voltage proportional to sin $(A-\theta)$ from the winding 22. When the rotor has reached its null position, that is to say the error voltage is zero, then $$\sin (A-\theta) + \cos (A-\theta) \tan B = 0$$

It may be shown that the expression on the left hand side of this equation reduces to $$1/\cos B \cdot \sin (A+B-\theta)$$

so that the null condition reduces to $$\sin (A+B-\theta) = 0$$

so long as cos B is not zero. The latter condition will generally be fulfilled since B has been regarded as an increment added to A and its value in the example given would not exceed 0.01 of $2\pi$. The condition $$\sin (A+B-\theta) = 0$$

is satisfied when $\theta = A+B$, so that the rotor is set in the desired position. It will be observed that this system requires only two cores and is thus more economical than the known arrangement.

In some cases sufficient accuracy may be obtained if a linear function of B is used in place of a tangent function as described. In this case the auto-transformer 23 with tappings arranged to follow a tangent law is replaced by one having evenly spaced taps. While the invention has been described with reference to one embodiment it is not intended that it should be limited thereto. In an alternative way of carrying out the invention, the conventional resolver elements may be replaced by "Inductosyn" elements and of course buffer amplifiers may be employed generally to avoid errors due to the loading of any output winding.

What I claim is:
1. A position control servo mechanism including a resolver having first and second relatively movable parts each provided with two inductors in quadrature, means for producing and applying to the respective inductors on the first part alternating voltages respectively representing the sine and cosine of a first angle, means for deriving an output voltage from one of the inductors on the second part, and means for producing relative displacement of the resolver parts in response to the output voltage in a sense tending to reduce the output voltage, wherein the improvement comprises means for deriving a second output voltage from the other of the inductors on the second part, means for producing a fraction of the second output voltage, which fraction is dependent on a second angle, and means for adding the fraction of the second output voltage to the output voltage from the one of the inductors on the second part to modify the latter output voltage, whereby the relative displacement tends to that represented by the sum of the first and second angles.

2. A servo mechanism according to claim 1, in which the means for producing and applying alternating voltages includes means for generating a plurality of alternating voltages respectively representing the sine and cosine of a series of angles spaced apart by the same angular interval and means for selecting from among the voltages generated by the generating means, the voltages respectively representing the sine and cosine of the first angle, and the means for producing a fraction of the second output voltage includes auto-transformer means with a series of tappings respectively corresponding to a second series of angles smaller than the angular interval, and means for selecting from among the tappings, the tapping corresponding to the second angle.

3. A servo mechanism according to claim 2, in which the means for producing a fraction of the second output voltage is arranged to proportion the second output voltage as the tangent of the second angle.

4. A servo mechanism according to claim 1 in which the means for producing a fraction of the second output voltage is arranged to proportion the second output voltage as the second angle.

References Cited
UNITED STATES PATENTS

| | | | |
|---|---|---|---|
| 2,467,646 | 4/1949 | Agins | 318—28 X |
| 2,922,579 | 1/1960 | Goldman | 318—28 X |
| 2,988,685 | 6/1961 | Agins et al. | 318—28 X |
| 3,042,307 | 7/1962 | Booth et al. | 235—186 |
| 3,296,427 | 1/1967 | Clemence et al. | 235—186 |

BENJAMIN DOBECK, *Primary Examiner.*

U.S. Cl. X.R.

235—186